(12) United States Patent  (10) Patent No.: US 8,817,400 B1
Nangare et al.  (45) Date of Patent: Aug. 26, 2014

(54) STORAGE DEVICE INTERFACE FOR SHINGLED MAGNETIC RECORDING SYSTEM (75) Inventors: Nitin Nangare, Santa Clara, CA (US); Hongying Sheng, San Jose, CA (US); Vincent Wong, Fremont, CA (US); Gregory Burd, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 279 days.

(21) Appl. No.: 13/287,305

(22) Filed: Nov. 2, 2011

Related U.S. Application Data (60) Provisional application No. 61/412,359, filed on Nov. 10, 2010.

(51) Int. Cl.
*G11B 5/09* (2006.01)
(52) U.S. Cl.
USPC ........... 360/39; 360/25; 360/31; 360/40; 360/41; 360/53; 360/57; 360/61
(58) Field of Classification Search
None
See application file for complete search history.

(56) References Cited

U.S. PATENT DOCUMENTS

| | | | |
|---|---|---|---|
| 6,185,063 B1 | 2/2001 | Cameron | |
| 6,442,705 B1 | 8/2002 | Lamberts | |
| 6,549,362 B1 | 4/2003 | Melrose et al. | |
| 6,697,209 B2 | 2/2004 | Hughes et al. | |
| 6,724,702 B2 * | 4/2004 | Taguchi et al. | 369/47.17 |
| 6,862,155 B2 | 3/2005 | Yang et al. | |
| 6,963,528 B2 | 11/2005 | Ogura | |
| 7,082,007 B2 | 7/2006 | Liu et al. | |
| 7,126,890 B2 | 10/2006 | Learned et al. | |
| 7,209,305 B2 | 4/2007 | Chan et al. | |
| 7,218,665 B2 | 5/2007 | McElwain | |
| 7,423,828 B2 * | 9/2008 | Emo et al. | 360/60 |
| 7,457,075 B2 | 11/2008 | Liu et al. | |
| 7,567,397 B2 | 7/2009 | Lu | |
| 7,729,071 B2 * | 6/2010 | Harada | 360/39 |
| 7,768,729 B2 | 8/2010 | Moser et al. | |
| 7,965,465 B2 * | 6/2011 | Sanvido et al. | 360/60 |
| 8,014,097 B1 | 9/2011 | Sanvido | |
| 8,125,723 B1 | 2/2012 | Nichols et al. | |
| 8,139,301 B1 | 3/2012 | Li et al. | |
| 8,259,409 B2 | 9/2012 | Braganca et al. | |
| 8,300,339 B1 * | 10/2012 | Nangare et al. | 360/39 |
| 8,441,750 B1 * | 5/2013 | Nangare et al. | 360/39 |
| 8,638,513 B1 * | 1/2014 | Burd | 360/39 |
| 8,638,522 B2 * | 1/2014 | Matsuo et al. | 360/77.02 |
| 2003/0218955 A1 | 11/2003 | Isshiki et al. | |
| 2007/0074083 A1 * | 3/2007 | Olds et al. | 714/54 |
| 2007/0177292 A1 | 8/2007 | Bui et al. | |
| 2008/0151704 A1 * | 6/2008 | Harada | 369/30.22 |
| 2008/0174905 A1 * | 7/2008 | Ueda | 360/77.04 |
| 2011/0209026 A1 * | 8/2011 | Xia et al. | 714/752 |

\* cited by examiner

*Primary Examiner* — Dismery Mercedes (57) ABSTRACT

A data storage device includes a storage medium on which data is stored in overlapping tracks, and a medium controller that directs storage of data on, and reading of data from, the storage medium, including encoding data being stored and decoding data being read. The decoding includes, when reading a first track, cancelling interference from a second track that overlaps the first track. The data storage device also includes a host controller in communication with the medium controller. The host controller includes memory that stores data decoded, and data to be written, by the medium controller. Communication between the medium controller and the host controller includes signals derived from data on said first and second tracks for facilitating the cancelling. A method of operating a data storage device includes, when reading a first track, facilitating the cancelling by communicating signals derived from the data on the first and second tracks.

21 Claims, 8 Drawing Sheets

STORAGE DEVICE INTERFACE FOR SHINGLED MAGNETIC RECORDING SYSTEM

CROSS REFERENCE TO RELATED APPLICATION

This claims the benefit of copending, commonly-assigned U.S. Provisional Patent Application No. 61/412,359, filed Nov. 10, 2010, which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

This disclosure relates to a method and system for reading and writing data in an arrangement of tracks on a storage medium that is written and read by a head that moves relative to the surface of the storage medium. More particularly, this disclosure relates to a control interface for such a storage medium that facilitates compensating, during operation, for contributions to the signal from an adjacent track or tracks.

In magnetic recording, as one example of a type of recording in which reading and writing are performed by a head that moves relative to the surface of the storage medium, data may be written in circular tracks on a magnetic disk. In some magnetic recording systems, track pitch was limited by the write head width. The read head was designed to be narrower than the write head so that reading can occur without picking up signals from any adjacent track. In addition, guard bands—empty bands on either side of each track—were provided to help prevent cases where data on one track are overwritten during writing of an adjacent track because of write head positioning errors.

In order to increase recording densities, track pitch has been decreased and the guard bands between the tracks have been reduced or removed, to allow more tracks to fit on the recording medium. For example, in Shingled Magnetic Recording, the tracks are written so that one track partially overlaps the previous track. In such a system, track pitch theoretically may be arbitrarily small. However, if track pitch is narrower than the read head width, then the read head may pick up a significant amount of signals from one or more adjacent tracks, leading to low data reliability.

Therefore, in order to further reduce the track pitch, it is necessary to mitigate the interference picked up from adjacent tracks during a read operation. If the component of the adjacent track picked up by the read head is sufficiently small, it may be possible to use knowledge of the data written on the adjacent track to carry out inter-track interference ("ITI") cancellation.

SUMMARY

A data storage device according to this disclosure includes a storage medium on which data is stored in overlapping tracks, a medium controller that directs storage of data on, and reading of data from, the storage medium, including encoding of data being stored and decoding of data being read. The decoding includes, when reading a first track, cancelling interference from a second track that overlaps the first track. The data storage device also includes a host controller in communication with the medium controller. The host controller includes memory that stores data decoded by the medium controller and data to be written by the medium controller. Communication between the medium controller and the host controller includes signals derived from the data on said first and second tracks for facilitating the cancelling.

In the data storage device, the signals derived from the data may include timing information for determining relative alignment of the first and second tracks, and a signal indicating whether the data have been decoded successfully.

In the data storage device, the communication may include writing of the signals derived from the first track to the memory for later use, as the signals derived from the second track, when reading a different track.

A method of operating a data storage device according to this disclosure includes when reading a first track, cancelling interference from a second track that overlaps the first track, and facilitating the cancelling by communicating signals derived from the data on the first and second tracks.

In the method, the signals derived from the data may include timing information for determining relative alignment of the first and second tracks, and a signal indicating whether the data have been decoded successfully.

In the method, the communicating may include writing of the signals derived from the first track to a memory for later use, as the signals derived from the second track, when reading a different track.

The method may also include reading the data from the first track, deriving a first group of the signals from the data from the first track, and storing the data from the first track and the first group of signals.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure describes an interface between a host controller and a Shingled Magnetic Recording (SMR) system or other small-track-pitch recording system (e.g., Two-Dimensional Magnetic Recording (TDMR)). Such an interface, between the host controller (e.g., a hard disk controller) and the read-data-channel controller, accommodates signaling used to perform ITI cancellation techniques where appropriate.

Figure 1:
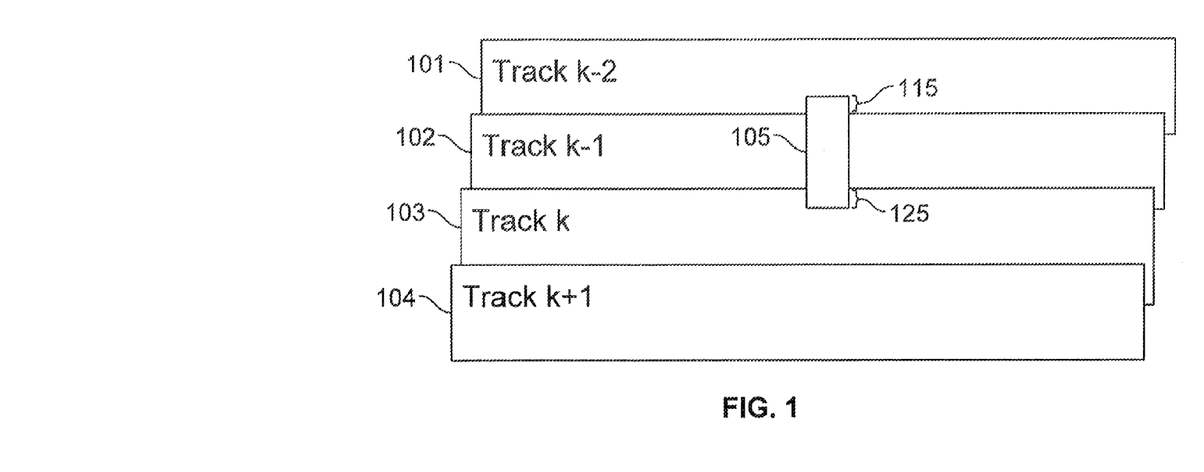
FIG. 1 is a simplified schematic view of four shingled data tracks with a read head.
Figure 2:
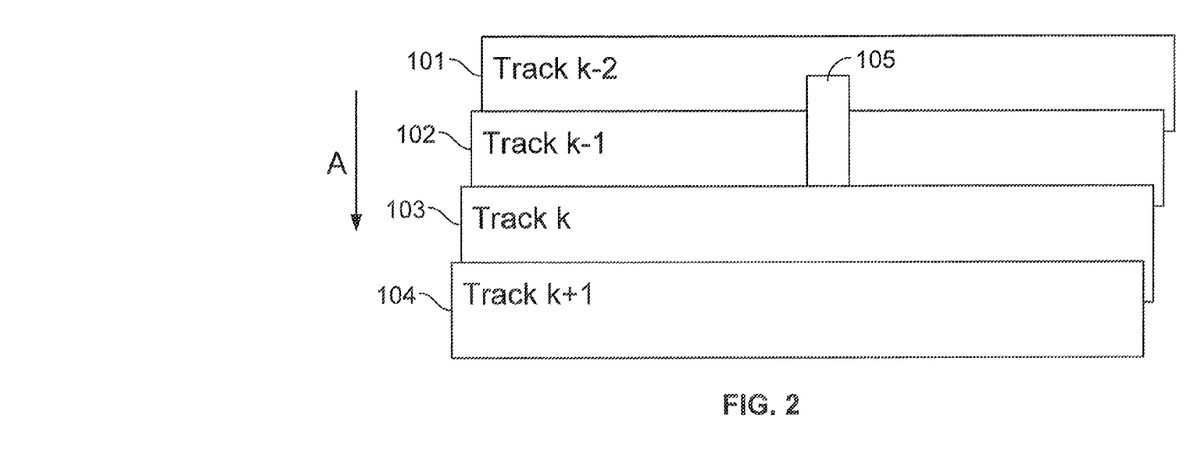
FIG. 2 is a view similar to FIG. 1 in which the read head is positioned to read contributions from a track of interest and only one additional track.

FIG. 1 shows a simplified schematic view of four shingled data tracks 101, 102, 103, 104, with a read-head 105 wider than the track pitch. Track 101 is written first, followed by track 102, 103, etc. Because the tracks are written in a shingled manner—e.g., track 102 partially overwrites information written on track 101—if the read head width is wider than the track pitch, read head 105 will pick up significant signal components from one or more adjacent tracks 101, 103 as indicated at 115 and 125, making it more difficult to demodulate data from the current track 102. As shown in FIG. 2, one possible way to deal with ITI is to use decisions from adjacent track to cancel ITI in the current track, by positioning read head 105 so that substantially all contributions to ITI come from a single track adjacent to the track of interest, as opposed two adjacent tracks as in FIG. 1.

Assuming that the tracks are read in the same order 101, 102, 103, 104, etc., in which they were written, as indicated by arrow A, then during the reading and decoding of track k (103), the hard disk controller may provide a read-back signal corresponding to the data on track k−1 (102), which has been read previously. The read-back information may used to cancel the ITI contribution to track k (103) from track k−1 (102).

Figure 3:
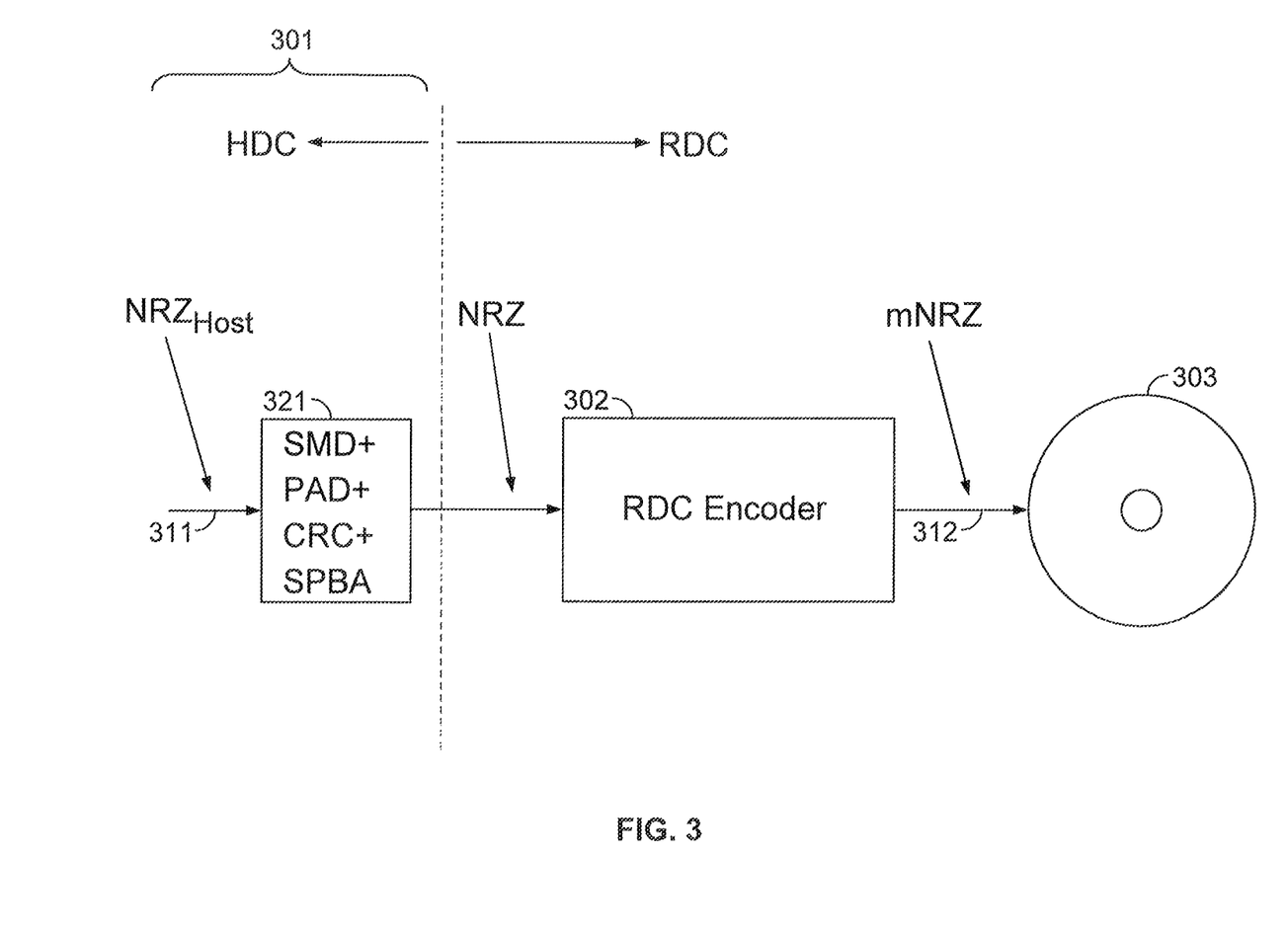
FIG. 3 is a schematic representation of a hard disk controller interacting with a read data channel of storage device.

Such a correction technique, one example of which is described in copending, commonly-assigned U.S. patent application Ser. No. 12/882,802, filed Sep. 15, 2010 and hereby incorporated by reference herein in its entirety, which describes a method and system for compensating for ITI by using actual or estimated data from the adjacent track, may involve pre-reading of the adjacent track and storage of the decoder decisions. For example, a system utilizing such a technique may use a Non-Return-to-Zero ("NRZ") encoding/decoding scheme. As shown in FIG. 3, the host controller (e.g., a hard drive controller (HDC) 301) may provide the actual NRZ bits 311 representing actual user data, along with additional control data 321 (e.g., sector metadata (SMD), pad bits (PAD), cyclic redundancy check (CRC) and/or skewed physical block address (SPBA)) to RDC controller 302 which uses the NRZ data 311 and the control data 321 to derive media-NRZ (mNRZ) data 312—namely, the actual bits written onto the storage medium 303. It is the mNRZ bits from one track that could give rise to ITI in an adjacent track. Therefore, for proper ITI cancellation, it would be more useful to know the mNRZ bits than the NRZ bits.

Figure 4:
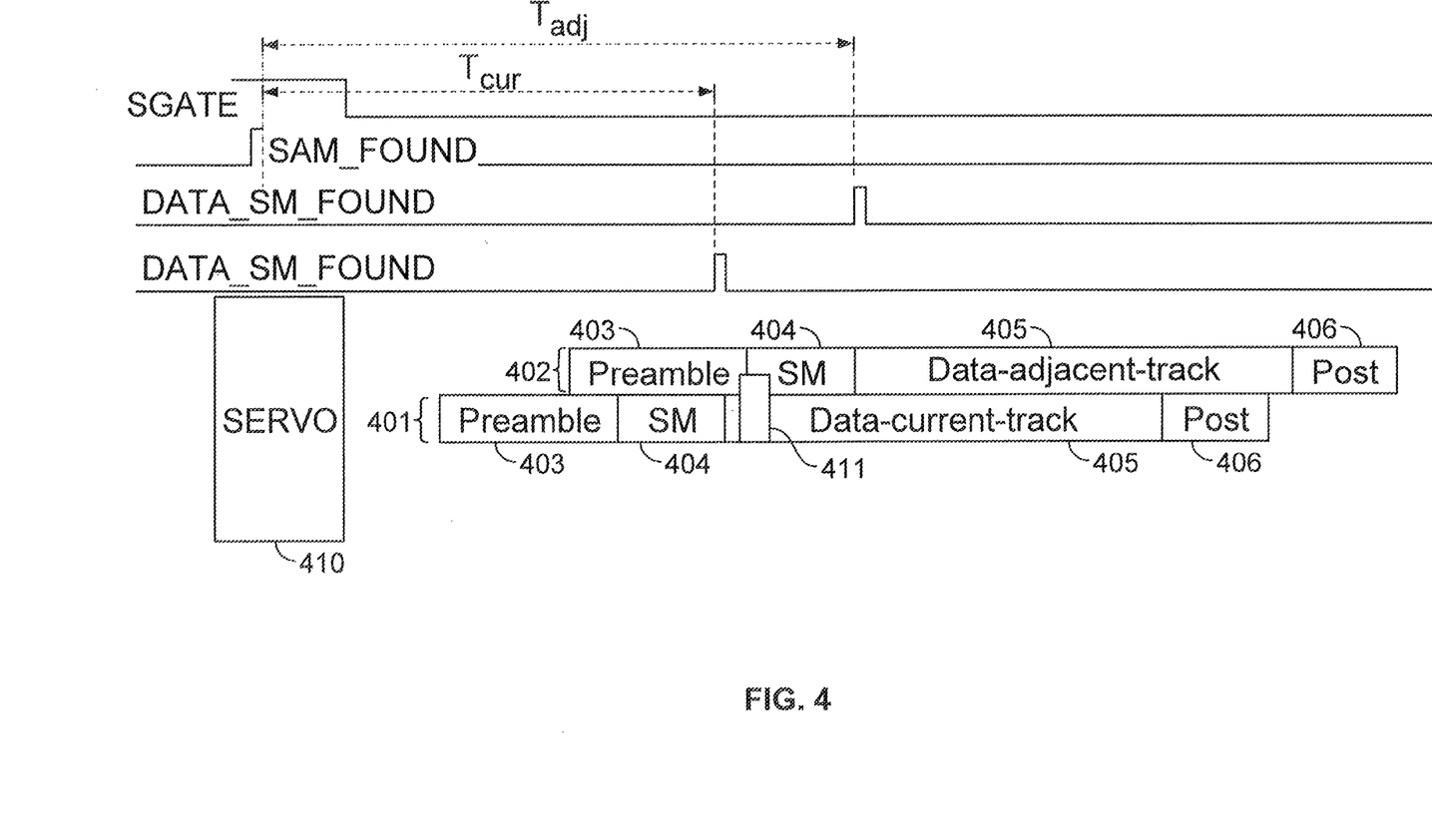
FIG. 4 is a schematic representation of adjacent tracks on a storage medium, illustrating alignment issues.

It also is helpful for proper ITI cancellation to know the degree of alignment between adjacent tracks. As seen in the example of FIG. 4, each of the current track 401 (e.g., a track to be read) and the adjacent track 402 (e.g., a contributor of ITI to track 402), has a preamble field 403, a sync mark field 404, a data payload 405 and a postamble field 406. However, the two tracks are not necessary perfectly aligned with one another. Therefore, even if the data in adjacent track 402 are known, determining the contribution of those data to ITI in track 401, so that ITI cancellation can be performed, may require knowing the relative alignment of track 402 with track 401.

As further seen in FIG. 4, the servo 410 which controls read head 411 can generate a servo-address-mark-found (SAM_FOUND) signal, and then a data-sync-mark (DATA_SM_FOUND) signal is generated when the sync mark of each sector on each track is found. The offset between the SAM_FOUND signal and each respective DATA_SM_FOUND signal may be used as a respective time-stamp (TS) signal allowing RDC controller 302 to determine at least a rough alignment of the two tracks 401, 402.

In an ITI cancellation technique that relies on data previously read from an adjacent track, it is important to know about certain properties of that data.

As an initial matter, one should know whether or not one indeed knows about the adjacent track data at all. For example, the adjacent track may not have been read previously. Alternatively, even if the adjacent track had been read, the system may have been unsuccessful in decoding the track data.

In particular, during a read operation, if RDC controller 302 successfully decodes a codeword, the hard disk controller (or host controller) stores the NRZ data of the decoded codeword in a memory, but if decoding is unsuccessful, RDC controller 302 stores the undecoded mNRZ data directly off storage medium 303. When performing ITI cancellation for another track for which the original track is now the adjacent track, what is needed is the mNRZ data. If the previous decoding was unsuccessful, the mNRZ data of the now-adjacent track are available, but if the previous decoding was successful, only the NRZ data of the now-adjacent track are available, and RDC controller 302 has to re-encode those NRZ data to derive the mNRZ data of the now-adjacent track. Therefore, it would be useful to know whether the data stored for the previous track are NRZ data or mNRZ data.

Figure 5:
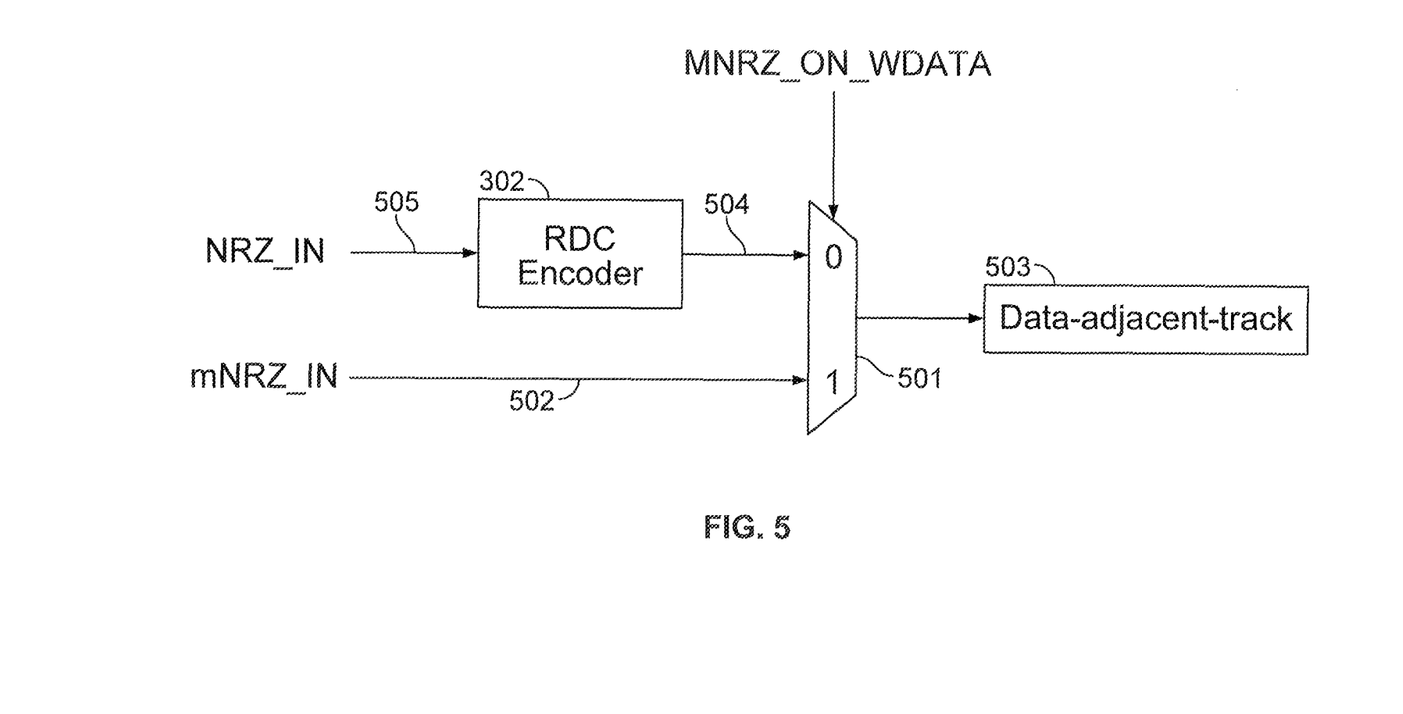
FIG. 5 is a representation of data selection in accordance with an aspect of the disclosure.

One way of accomplishing this may be to set a flag (MNRZ_ON_WDATA). As seen in FIG. 5, if the flag (MNRZ_ON_WDATA) is set, a multiplexer 501 will simply choose the mNRZ data 502 as the adjacent track data 503 to be used for cancellation purposes. However, if the flag (MNRZ_ON_WDATA) is not set, then multiplexer 501 selects re-encoded mNRZ data 504, output by RDC controller 302 based on re-encoding of stored NRZ data 505 from the decoded adjacent track.

Another factor that may be taken into consideration in using adjacent track data for ITI cancellation is track defects. A predetermined pattern may be written to a defective sector rather than simply mapping out that sector. The pattern can be a DC pattern—either all zeroes or all ones—which is filtered out by a high-pass filter in RDC controller 302, or an AC-erase "1T pattern" of alternating ones and zeroes which, because of its regular nature, generates minimal interference on adjacent tracks. Because one of those patterns is written to the defective sector, any random and higher interference signals that would otherwise have been generated based on that sector will not be generated.

Figure 6:
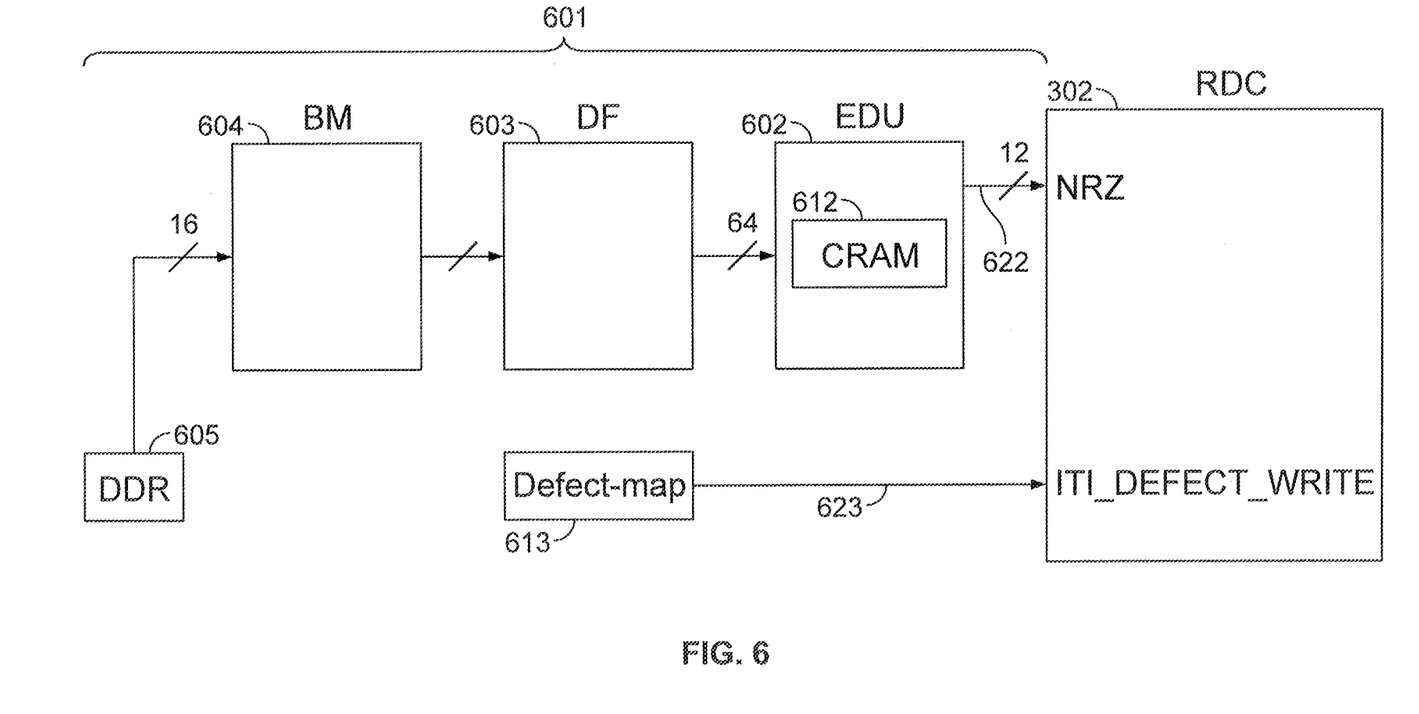
FIG. 6 is a schematic representation of an HDC-RDC interface in accordance with an embodiment of the disclosure, in the write direction.
Figure 7:
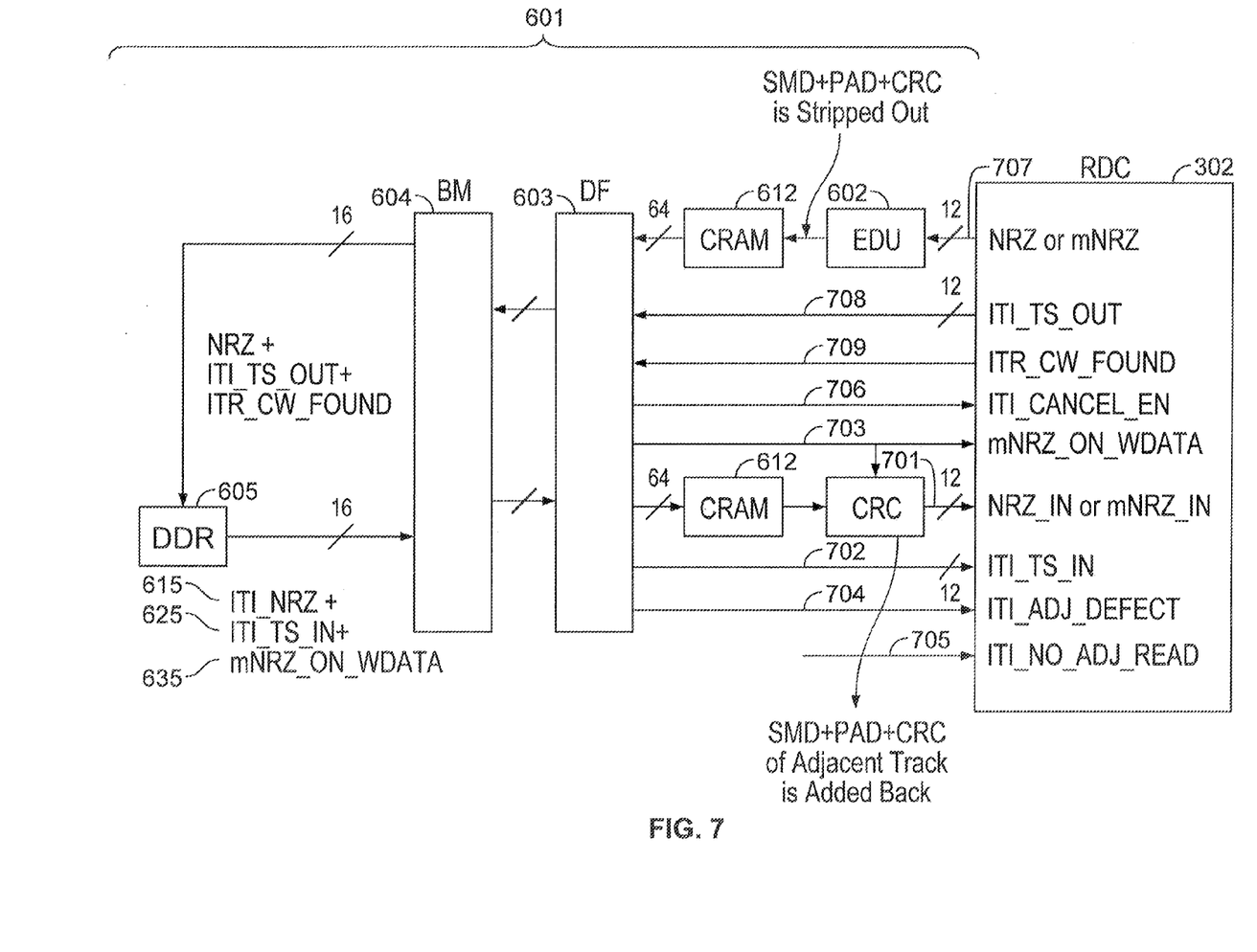
FIG. 7 is a schematic representation of an HDC-RDC interface in accordance with an embodiment of the disclosure, in the read direction.

To deal with these issues, signaling between the hard disk controller (HDC) and RDC controller 302 may include signals, used for ITI cancellation, regarding the adjacent track. To illustrate such signaling, an HDC-RDC datapath 600 is illustrated in FIGS. 6 and 7 and includes RDC controller 302, as well as a hard disk controller portion 601 having an error detection unit (EDU) 602 with conversion RAM (CRAM) 612, a disk formatter (DF) 603, a buffer manager (BM) 604 and memory (e.g., DDR memory) 605 for storing, among other things, decoded codewords from storage medium 303. A defect map 613 may be provided in association with disk formatter 603 to maintain a map of defective sectors (i.e., sectors to which a predetermined pattern should be written as described above).

The write direction of data path 600 is shown in FIG. 6. Data to be written to storage medium 303 are provided by the host to memory 605. When a particular sector is to be written, the data are read from memory 605 and pass through buffer manager 604, disk formatter 603 and error detection unit 602, and are transferred to RDC controller 302 as NRZ data 622. A signal (ITI_DEFECT_WRITE) 623 is provided by defect map 613 to RDC controller 302 to indicate whether or not the current sector, represented by NRZ data 622, is defective. This allows RDC controller 302, to write a predetermined pattern on a defective sector.

As seen in FIG. 7, the signaling is more complex in the read direction, where RDC controller 302 is reading a particular track requested by hard disk controller 601 and providing decoded codewords to the hard disk controller 601 for storage in memory 605. Thus, when hard disk controller 601 requests a particular track from RDC controller 302, it also sends, from memory 605, the adjacent track data (ITI_NRZ) 615 needed for ITI cancellation, along with time-stamp data (ITI_TS_IN) 625 (if they exist) and the MNRZ_ON_WDATA signal 635.

These data pass through buffer manager (BM) 604, disk formatter (DF) 603 and error detection unit (EDU) 602. Thus, after the ITI_NRZ track data 615 pass through disk formatter 603, and conversion RAM (CRAM) 612, SMD, PAD and CRC control data are added to convert from host data to RDC data if MNRZ_ON_WDATA==0 (before passing to RDC controller 302 at 701. If MNRZ_ON_WDATA==1 then no addition of control data is required. Time-stamp data (ITI_TS_IN) 625 (if they exist) and the MNRZ_ON_W-DATA signal 635 are passed to RDC controller 302 at 702, 703.

Other signals are passed to RDC controller 302 for used in the ITI cancellation process. An ITI_ADJ_DEFECT signal at 704 identifies whether or not a sector on the adjacent track contains a defect (meaning that other data may be missing and RDC controller 302 should act accordingly), and similarly an ITI_NO_ADJ_READ signal at 705 identifies situations where the adjacent track has not been previously been read (so that RDC controller 302 should act accordingly, as described below). In addition, an ITI cancellation enable signal (ITI_CANCEL_EN) at 706 specifies whether ITI cancellation should be performed at all. Although this signal would almost always be in the Enable state, there may be situations when it is not. For example, the SMR system may be operated in a non-shingled mode in which ITI cancellation may not be necessary.

Based on all of these inputs, RDC controller 302 will read the requested track or sector. If RDC controller 302 is successful in decoding the requested data, it will output NRZ bits at 707; otherwise it will output the undecoded mNRZ bits at 707. RDC controller 302 also will output time-stamp data (ITI_TS_OUT) at 708 which would be needed later when the current track being decoded is the adjacent track for another track to be decoded (at which point it will become ITI_TS_IN for that track). Finally, RDC controller 302 will output a signal (ITR_CW_FOUND) at 709 that indicates whether it was successful in decoding the current codeword (this signal will be used later as the basis of the MNRZ_ON_WDATA signal when the current data is the adjacent track data).

The NRZ signal output at 707 has its SMD, PAD and CRC stripped out by error detection unit 602 for conversion to the host format if ITR_CW_FOUND==1—i.e. if codeword decoding is successful. If ITR_CW_FOUND==0, then no control data are stripped out and the MNRZ data are passed as they are to DDR memory 605. Those converted data, along with the ITI_TS_OUT and ITR_CW_FOUND signals, are passed back through disk formatter 603 and buffer manager 604 to memory 605 for use later as adjacent track data, and also, in the case of the NRZ data, for output to the host system.

Figure 8:
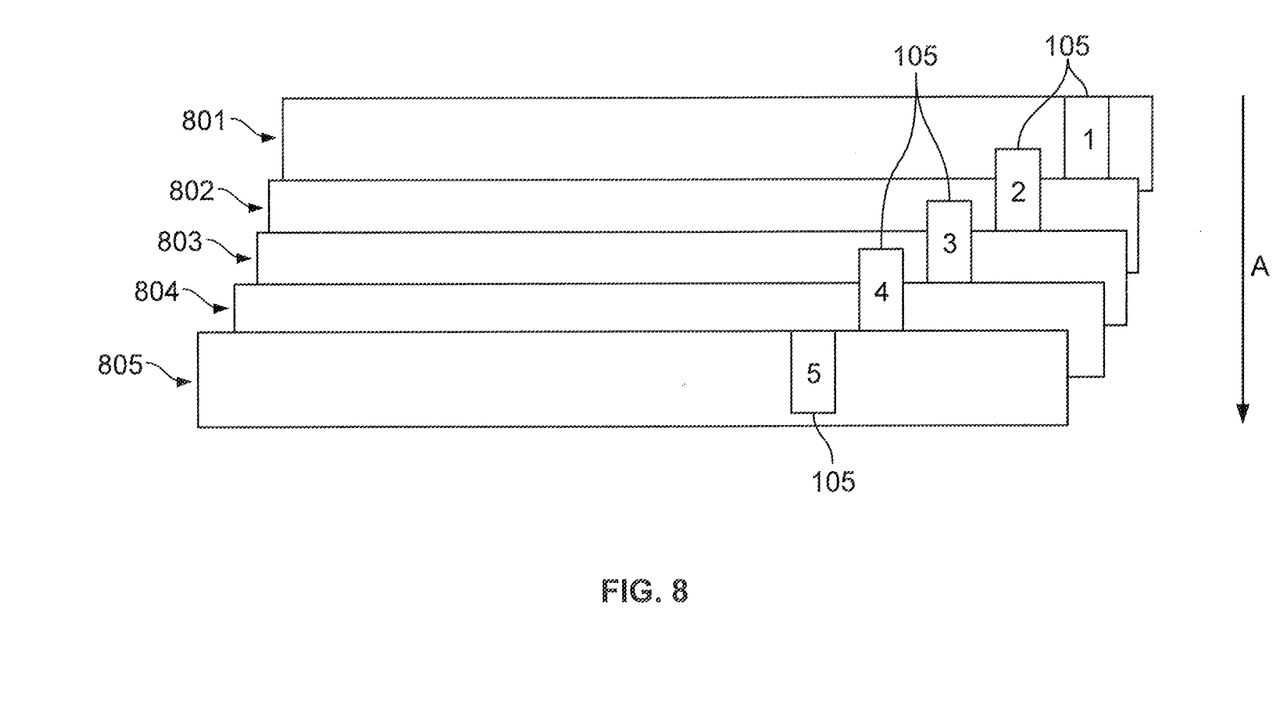
FIG. 8 is a representation of a first technique for reading multiple tracks in accordance with an embodiment of the disclosure.
Figure 9:
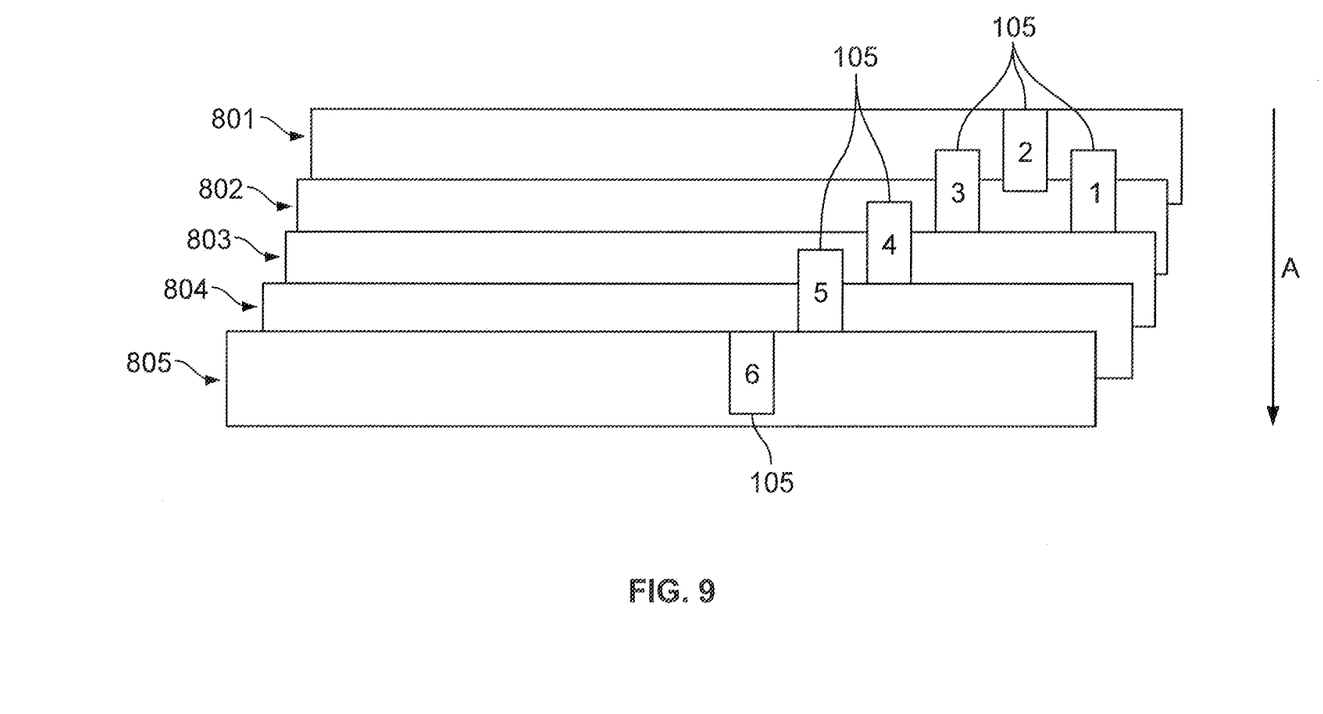
FIG. 9 is a representation of a second technique for reading multiple tracks in accordance with an embodiment of the disclosure.

FIGS. 8 and 9 show two different approaches to performing read operations with ITI cancellation where there is no adjacent track data for tracks to be read (e.g., because a track is at the edge of the zone boundary).

FIG. 8 shows a straightforward approach. In this example, there are five shingled tracks 801-805, which are both written and read in the direction indicated by arrow A. The positions of read head 105 are shown for each track read operation. Thus, for tracks 801 and 805, read head 105 is positioned so that it reads only from the track to be read, while for tracks 802-804, read head 105 is positioned so that it reads from both the track to be read and the previous track. In this case, for each of tracks 802-804, the "normal" read mode including ITI cancellation is used, while for each of tracks 801 and 805, a "no-adjacent-read" mode is used, in which no ITI cancellation is performed. In the latter case, the aforementioned ITI_NO_ADJ_READ signal would be asserted.

FIG. 9 shows a different approach, involving six read operations for the five tracks 801-805. In this example, track 802 is read first, but with read head 105 overlapping track 801. Because there has been no previous read operation, this read operation is performed in the "no-adjacent-read" mode is used. Track 801 is then read using the "normal" ITI cancellation mode described above, with data from track 802 from the first operation used as the adjacent track data. As a third read operation, track 802 is read again, using the "normal" ITI cancellation mode, with data from track 801 as the adjacent track data. The data obtained for track 802 in the first operation are used only to support reading of track 801, while the data from the third read operation are kept as output data for track 802. The iterative nature of this process improves the decoding reliability for track 801. Next, each of tracks 803 and 804 is read using the "normal" read mode including ITI cancellation, while for track 805, the "no-adjacent-read" mode is used. As in the example of FIG. 8, the ITI_NO_ADJ_READ signal is used to indicate which mode is used.

Thus it is seen that a data storage system, and method of decoding stored data, in which the interface between the host controller and the RDC controller supports ITI cancellation operations, including different modes of those operations, has been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A data storage device comprising:
   a storage medium on which data is stored in overlapping tracks;
   a medium controller that directs storage of data on, and reading of data from, said storage medium, including encoding of data being stored and decoding of data being read, said decoding including, when reading a first track, cancelling interference from a second track that overlaps said first track; and
   a host controller in communication with said medium controller, said host controller including memory that stores data decoded by said medium controller and data to be written by said medium controller; wherein:
   communication between said medium controller and said host controller includes signals derived from said data on said first and second tracks for facilitating said cancelling, said signals derived from said data including at least one of:
   timing information for determining relative alignment of said first and second tracks along their respective track lengths, whereby said interference from said second track is temporally aligned with said data being read from said first track to facilitate said cancelling, or a signal indicating whether said data have been decoded successfully, allowing said decoded data to be converted to a coding format used on said medium to facilitate said cancellation.

2. The data storage device of claim 1 wherein:
said signals derived from said data include both:
said timing information for determining relative alignment of said first and second tracks; and
said signal indicating whether said data have been decoded successfully.

3. The data storage device of claim 2 wherein said communication further includes at least one control signal for determining a mode of said cancelling.

4. The data storage device of claim 3 wherein said at least one control signal comprises an enable signal.

5. The data storage device of claim 1 wherein said cancelling interference from a second track that overlaps said first track is based on data previously read from said second track.

6. The data storage device of claim 5 wherein:
said communication further includes at least one control signal for determining a mode of said cancelling; and
said at least one control signal comprises a signal indicating that said data previously read from said second track represent a storage medium defect.

7. The data storage device of claim 5 wherein, when said data have been decoded successfully, said communication further includes a signal resulting in conversion of said decoded data to said coding format used on said storage medium before said decoded data are used as said data previously read from said second track.

8. The data storage device of claim 1 wherein said communication includes writing of said signals derived from said first track to said memory for later use, as said signals derived from said second track, when reading a different track.

9. The data storage device of claim 8 wherein said communication includes reading of said signals written to said memory to control said medium controller for reading said different track.

10. A method of operating a data storage device having a storage medium on which data is stored in overlapping tracks; said method comprising:
when reading a first track, cancelling interference from a second track that overlaps said first track; and
facilitating said cancelling by communicating signals derived from said data on said first and second tracks, said signals derived from said data including at least one of:
timing information for determining relative alignment of said first and second tracks along their respective track lengths, whereby said interference from said second track is temporally aligned with said data being read from said first track to facilitate said cancelling, or a signal indicating whether said data have been decoded successfully, allowing said decoded data to be converted to a coding format used on said medium to facilitate said cancellation.

11. The method of claim 10 wherein:
said signals derived from said data include both:
said timing information for determining relative alignment of said first and second tracks; and
said signal indicating whether said data have been decoded successfully.

12. The method of claim 11 wherein said communicating further includes communicating at least one control signal for determining a mode of said cancelling.

13. The method of claim 12 wherein said at least one control signal comprises an enable signal.

14. The method of claim 10 wherein said cancelling interference from a second track that overlaps said first track is based on data previously read from said second track.

15. The method of claim 14 wherein:
said communicating further includes communicating at least one control signal for determining a mode of said cancelling; and
said at least one control signal comprises a signal indicating that said data previously read from said second track represent a storage medium defect.

16. The method of claim 14 wherein, when said data have been decoded successfully, said method further comprises converting said decoded data to said coding format used on said storage medium before using said decoded data as said data previously read from said second track.

17. The method of claim 10 wherein said communicating includes writing of said signals derived from said first track to a memory for later use, as said signals derived from said second track, when reading a different track.

18. The method of claim 17 wherein said communicating includes reading of said signals written to said memory to control reading of said different track.

19. The method of claim 10 further comprising:
reading said data from said first track;
deriving a first group of said signals from said data from said first track; and
storing said data from said first track and said first group of signals.

20. The method of claim 19 further comprising:
reading data from a different track using said stored data and said stored first group of signals that had been read from said first track.

21. The method of claim 19 further comprising:
reading data from said second track before reading data from said track; and
re-reading said second track after reading said first track using said stored data and said stored different group of signals that had been read from said first track.

* * * * *